United States Patent [19]

Thomas et al.

[11] 4,089,694
[45] May 16, 1978

[54] GLASS COMPOSITION

[75] Inventors: George L. Thomas, Bay Village; Edward L. Woodall, Jr., Lyndhurst, both of Ohio

[73] Assignee: General Electric Company, Schenectady, N.Y.

[21] Appl. No.: 711,437

[22] Filed: Aug. 4, 1976

[51] Int. Cl.$^2$ .............. C03C 3/10; C03C 3/04
[52] U.S. Cl. ........................... 106/53; 106/52
[58] Field of Search ........................ 106/52, 53

[56] References Cited

U.S. PATENT DOCUMENTS

| | | | |
|---|---|---|---|
| 2,527,693 | 10/1950 | Armistead | 106/52 |
| 3,445,255 | 5/1969 | Monks, Jr. | 106/52 |
| 3,837,831 | 9/1974 | Moore | 106/52 |

Primary Examiner—Winston A. Douglas
Assistant Examiner—Mark Bell
Attorney, Agent, or Firm—John F. McDevitt; Lawrence R. Kempton; Frank L. Neuhauser

[57] ABSTRACT

A CaO containing silicate glass composition which can further contain small amounts of lead oxide and barium oxide is generally useful for hermetically sealing the electrical in-leads of various electrical devices. The present glass has a composition range in percentages by weight of:

| Constituents | Weight Percent |
|---|---|
| $SiO_2$ | 65–75 |
| $Na_2O$ | 9–13 |
| $K_2O$ | 3–6 |
| $Al_2O_3$ | 1–4 |
| CaO | 4–8 |
| BaO | 0–4 |
| PbO | 0–6 |
| $Li_2O$ | 0–2 | along with minor amounts of incidental impurities, residual fluxes and refining agents.

2 Claims, No Drawings

GLASS COMPOSITION

BACKGROUND OF THE INVENTION

This invention relates to silicate glass compositions containing CaO which provide a substitute for the high lead content glasses now commonly used in the spacing apart of the electrical in-lead components of electric lamps and similar devices. In the manufacture of electric lamps such as incandescent and fluorescent type lamps as well as television picture tubes and other electron discharge devices it is conventional to employ glass tubing in the form of stems, exhaust tubes, and flares to support and hermetically seal the electrical in-leads within a sealed glass envelope. The prior art glasses containing as much as 30% by weight PbO which are being used in this manner exhibit a volume electrical resistivity high enough to prevent conductivity between the spaced apart in-leads during operation of the particular electrical device. The prior art glasses also exhibit a long enough softening range to permit hand or relatively slow machine speeds to be employed in device manufacture.

On the other hand, the lead oxide constituent of these prior art glasses has always been relatively high priced. It is toxicologically hazardous and when handling a glass batch containing 20-30% PbO produces dust and fumes which exceed statutory emission limits and represent the loss of high-priced raw material. During melting of such glass batches, there is also a tendency of inhomogeneous striae of glass containing higher amounts of lead oxide to settle to the bottom of the glass tank by reason of higher density compared with other homogeneous glass in the furnace and this leads to poor homogeneity glass in the final glass and size fluctuations in the tubing as drawn. Poor mixing and segregation in the glass tank necessitates longer melting and refining times than would be needed for glasses having a lower lead oxide content. Another problem encountered with the high lead content glasses during melting is attributable to high viscosity in the melting temperature region (1425° to 1525° C). Reduction of the glass viscosity would permit shorter melting and homogenizing times to be used. Still a different problem is encountered with high lead glass tubing during device manufacture whereby the very long working range necessitates slower device forming machine speeds than would otherwise be needed with a shorter working range glass. Understandably, higher cost is also associated in utilizing high lead content glasses since the higher density of these glasses produces less tubing of a given size than is possible with the same weight of glass having a lower density.

SUMMARY OF THE INVENTION

An important object of the present invention is to provide a low lead or lead free glass for hermetically sealing conventional in-lead metals such as Dumet in the manufacture of various electrical devices including electric lamps, electron discharge tubes and the like without sacrifice of electrical performance. A further object is to provide a more economical glass composition than the prior art high lead content glasses which can be used in this manner at higher manufacturing machine speeds in carrying out the hermetic sealing operation. A still further objective is to provide a clean melting glass which does not require air cleaning devices to meet statutory emission standards.

Briefly stated, the present glass composition comprises in terms of oxides calculated from the starting batch materials:

| Constituents | Weight Percent |
| --- | --- |
| $SiO_2$ | 65-75 |
| $Na_2O$ | 9-13 |
| $K_2O$ | 3-6 |
| $Al_2O_3$ | 1-4 |
| CaO | 4-8 |
| BaO | 0-4 |
| PbO | 0-6 |
| $Li_2O$ | 0-2 | except for incidental impurities, residual fluxes, and refining agents. Said glass composition further exhibits a softening point in the approximate range 625°-670° C, a working point in the approximate range 950°-990° C, an average coefficient of a thermal expansion in the 0°-300° C temperature range between about $87 \times 10^{-7}$ cm/cm/° C to about $97 \times 10^{-7}$ cm/cm/° C, and electrical resistivity greater than $10^{7.1}$ ohm/cm at 250° C and greater than $10^{5.5}$ at 350° C. The present glass composition is further characterized as distinctive in obtaining volume electrical resistivity comparable to the prior art high lead content glasses by replacement of most or all PbO with a lesser amount of CaO and the proper ratio of $Na_2O$ to $K_2O$ in the glass. In the preferred glasses, when the glass has a high CaO content within the narrow range permitted, then it has a high $Na_2O$ to $K_2O$ ratio whereas when the glass has a low CaO content within the permitted range, then it has a low $Na_2O$ to $K_2O$ ratio. The $Na_2O$ to $K_2O$ ratio ranges between about 1.5 to 4.5 with the preferred glasses having a high CaO content along with a $Na_2O$ to $K_2O$ ratio of approximately 4:1 for optimum working characteristics and electrical resistivity as hereinafter described in greater detail.

DESCRIPTION OF THE PREFERRED EMBODIMENTS

A comparison of the present glass composition with conventional 001 glass shown in Table I containing approximately 21.2 weight percent PbO by calculation points out important advantages during manufacture of the present glass as well as in subsequent utilization as a glass to metal sealing material. Absence or reduced level of PbO in the new glass which can range between 0-6 percent by weight produces a glass density approximately 10 percent lower than 001 glass along with lower PbO levels which is desirable from cost and pollution considerations. As previously mentioned, the lower density provides more lineal feed of tubing per pound of the new glass than is obtained with 001 glass. The electrical resistivity of the preferred new glass, Table I, Example 1, is slightly lower than 001 glass but most of the new glasses attain minimum resistivity of $10^{7.4}$ at 250° C along with a minimum resistivity of $10^{5.7}$ at 350° C. Since the new glasses have little or no PbO, there is a reduced possibility of build-up of the "lead trees" sometimes encountered with electrically conducting glass to metal seals utilizing the high lead containing 001 glass, so that the new glass seals provide more reliable long-term electrical isolation between the electrical in-leads. The new glass composition also provides glass which is softer in the sealing point and softening point regions compared with regular soda-lime glass and has approximately the same sealing temperature as 001 glass. The softer working characteristics of the new glass composition is determined to a large extent by maintaining the $Na_2O$, $Al_2O_3$, $Li_2O$, and CaO constituents within the relatively narrow ranges above specified and with the further optional BaO and PbO constituents helping provide the desired level of electrical resistivity.

The shorter working range for the new glasses of this invention when compared to 001 glass, along with retention of comparable sealing and working points permits faster forming machine speeds during lamp manufacture without other major adjustment in the lamp-making process. On the other hand, the lower melting temperature of the new glass composition can be about 1440° C compared with around 1500° C for 001 glass. The new glass composition has lower viscosity during melting than 001 glass with lesser PbO providing more glass homogeneity and less segregation. The melting capacity of a given size glass tank can be increased as a result, or the melting temperatures can be reduced to affect fuel economy. For a particular glass composition to provide a reliable hermetic seal with Dumet-type metals, the glass must have an average coefficient of linear thermal expansion in the 0–300° C temperature range between about $87 \times 10^{317}$ cm/cm/0° C to about $97 \times 10^{317}$ cm/cm/° C and with said expansion coefficient for the preferred glasses of the present invention being in the range between about $89 \times 10^{-7}$ cm/cm/° C to about $93 \times 10^{-7}$ cm/cm/° C.

It is generally desirable for Dumet seals to have working characteristics for the substitute glass which are similar to 001 glass, especially with respect to both working point and sealing point. A working range of at least 300° C is obtained with the present glass composition along with the sealing point in the approximate range 820°–870° C and a working point which lies in the approximate range 950°–990° C so as to be essentially equal to 001 glass at these two viscosity points. That the present glasses meet all criteria for fast and reliable sealing to Dumet-type metals while also being less prone to the "lead tree" type defects sometimes experienced with 001 glass can be attributed to the correct proportions of CaO, $K_2O$, $Na_2O$, and the absence of or low amount of PbO as specified herein.

Examples for preferred glasses which were melted and tested in the conventional manner are given below in Table I. The particular glass compositions reported in Table I were melted in pots containing 2 lbs. of glass each, at a temperature in the range 1425°–1475° C with the glass being refined at about 1330° C. As is common in glass technology, the glass compositions are reported in terms of oxides as calculated from the batch starting material.

TABLE I

| | Calculated Wt. % | | | | | | | | | | 001 Std. |
|---|---|---|---|---|---|---|---|---|---|---|---|
| | 1 | 2 | 3 | 4 | 5 | 6 | 7 | 8 | 9 | 10 | 20% Lead |
| $SiO_2$ | 70.6 | 70.1 | 70.1 | 66.1 | 74.1 | 70.1 | 70.1 | 66.1 | 74.1 | 70.3 | 62.6 |
| $Na_2O$ | 12.6 | 13.0 | 10.0 | 10.0 | 13.0 | 10.0 | 13.0 | 13.0 | 10.0 | 12.5 | 7.6 |
| $K_2O$ | 3.1 | 3.0 | 6.0 | 6.0 | 3.0 | 6.0 | 3.0 | 3.0 | 6.0 | 3.5 | 7.0 |
| $Al_2O_3$ | 2.1 | 2.0 | 2.0 | 2.0 | 2.0 | 2.0 | 2.0 | 2.0 | 2.0 | 2.0 | 1.3 |
| $As_2O_3$ | 0.2 | 0.2 | 0.2 | 0.2 | 0.2 | 0.2 | 0.2 | 0.2 | 0.2 | 0.2 | 0.3 |
| CaO | 6.4 | 4.0 | 8.0 | 8.0 | 4.0 | 4.0 | 8.0 | 8.0 | 4.0 | 6.7 | 0 |
| F | 0.9 | 0.9 | 0.9 | 0.9 | 0.9 | 0.9 | 0.9 | 0.9 | 0.9 | 0.9 | 0 |
| PbO | 3.3 | 6.0 | 2.0 | 6.0 | 2.0 | 6.0 | 2.0 | 6.0 | 2.0 | 0 | 21.2 |
| $Li_2O$ | 0.8 | 0.8 | 0.8 | 0.8 | 0.8 | 0.8 | 0.8 | 0.8 | 0.8 | 0.8 | 0 |
| BaO | 0 | 0 | 0 | 0 | 0 | 0 | 0 | 0 | 0 | 3.0 | 0 |
| Soft. Pt. ° C | 650 | 635 | 666 | 657 | 644 | 649 | 656 | 644 | 654 | 658 | 625 |
| Density gm/cc | 2.53 | 2.57 | 2.51 | 2.58 | 2.47 | 2.56 | 2.51 | 2.59 | 2.46 | 2.52 | 2.81 |
| Linear Thermal Expansion Coeff. (0–300° C)/° C | 92 | 94.2 | 93.6 | 94.0 | 94.5 | 93.0 | 96.0 | 96.3 | 91.8 | 94 | 91 |
| Elect. Resis. (log ohm-cm) at 250° C | 7.7 | 7.4 | 8.4 | 8.6 | 7.2 | 8.3 | 7.5 | 7.8 | 8.1 | 7.6 | 8.5 |
| at 350° C | 6.1 | 5.8 | 6.6 | 6.7 | 5.6 | 6.5 | 5.9 | 6.1 | 6.3 | 6.0 | 6.6 |
| Sealing Pt. ° C (Viscosity = $10^5$ poises) | 845 | 830 | 860 | 850 | 840 | 855 | 850 | 825 | 860 | 860 | 842 |
| Working Pt. ° C (Viscosity = $10^4$ poises) | 970 | 955 | 978 | 958 | 970 | 975 | 961 | 934 | 988 | 980 | 985 |
| Working Range | 320 | 320 | 312 | 301 | 326 | 326 | 305 | 310 | 334 | 322 | 360 |

As can be noted from the above table, the Example I glass closely approximates the working characteristics and electrical resistivity of standard 001 glass. The Example 7 and 8 glasses illustrate a high CaO content along with a high $Na_2O/K_2O$ ratio being used without significant loss of electrical resistivity. Correspondingly, the Examples 6 and 9 glass employs a low CaO content and a low $Na_2O/K_2O$ ratio in achieving the desired level of electrical resistivity. It can further be noted from said table that all glass compositions have a volume electrical resistivity greater than $10^{7.1}$ ohm/cm at 250° C and a resistivity greater than $10^{5.5}$ at 350° C.

A chemical analysis for the actual glass obtained in the foregoing manner from the batch formulation recited in Example 1 is reported below. The presence of small or trace amounts of $Fe_2O_3$, $TiO_2$, MgO and BaO in the glass is attributable to contamination of the indicated batch starting materials with the further reported metal ions.

| Constituents | Weight Percent |
|---|---|
| $SiO_2$ | 71.3 |
| $Fe_2O_3$ | 0.03 |
| $TiO_2$ | 0.02 |
| $Na_2O$ | 11.0 |
| $K_2O$ | 4.1 |
| $Al_2O_3$ | 2.3 |
| $As_2O_3$ | 0.1 |
| CaO | 6.5 |
| F | 0.6 |
| PbO | 3.2 |
| $Li_2O$ | 0.8 |
| BaO | 0.1 |
| MgO | 0.06 |
| | 100.11 |

As can be noted from the above analysis, the minor differences found between said Example 1 glass as calculated from the batch constituents and actual analyzed composition is due to slight volatility of some constituents as well as pickup of other materials from the refractories used to melt this glass. Consequently, the present invention contemplates a glass composition having essentially the same composition which is calculated in conventional manner from the starting batch formulation.

It will be apparent from the foregoing description that a novel lead substitute glass composition is provided which affords significant advantages as a general purpose sealing glass for the in-lead elements of various electrical devices compared with the 001 glass now being used. It is also apparent that other glasses than above specifically disclosed are included within the specified compositional limits. For example, the optional incorporation of BaO for PbO in the present glass composition provides comparable physical properties for sealing to Dumet metals. Additionally, it is contemplated to substitute like amounts of other alkaline earth oxides for BaO in the present glasses and still obtain comparable physical properties. It is intended to limit the present invention, therefore, only by the scope of the following claims.

What we claim as new and desire to secure by Letters Patent of the United States is:

1. A seal glass composition for electric devices which consists essentially of in approximate percent by weight 65–75 $SiO_2$, 9–13 $Na_2O$, 3–6 $K_2O$, 1–4 $Al_2O_3$, 4–8 CaO, 0–4 BaO, 0–6 PbO, 0–1F, and 0–2 $Li_2O$ along with minor amounts of incidental impurities, residual fluxes, and refining agents, and wherein the $Na_2O$ to $K_2O$ ratio lies between about 1.5 to about 4.5 with a high $Na_2O/K_2O$ ratio when the CaO is high whereas the $Na_2O/K_2O$ ratio is low when the CaO is low, said glass composition having a softening point in the approximate range 625°–670° C, a sealing point in the approximate range 820°–870° C, a working point in the approximate range 950°–990° C, a working range of at least 300° C, an average coefficient of linear thermal expansion in the 0°–300° C temperature range between about $87 \times 10^{-7}$ cm/cm/° C to about $97 \times 10^{-7}$ cm/cm/° C, and electrical resistivity greater than $10^{7.1}$ ohm-cm at 250° C together with an electrical resistivity greater than $10^{5.5}$ ohm-cm at 350° C.

2. A glass composition as in claim 1 having an average coefficient of linear thermal expansion in the 0°–300° C temperature range between about $89 \times 10^{-7}$ cm/cm/° C to about $93 \times 10^{-7}$ cm/cm/° C.